FREQUENCY BAND SEPARATION AMPLIFIER SYSTEM

Filed March 27, 1953

INVENTOR.
George C. Sziklai
BY [signature]
ATTORNEY 2,771,518
Patented Nov. 20, 1956

2,771,518

FREQUENCY BAND SEPARATION AMPLIFIER SYSTEM

George C. Sziklai, Princeton, N. J., assignor to Radio Corporation of America, a corporation of Delaware Application March 27, 1953, Serial No. 345,014

The terminal fifteen years of the term of the patent to be granted has been disclaimed 8 Claims. (Cl. 179—171)

This invention relates to frequency separation apparatus, and more particularly, although not necessarily exclusively, to apparatus for dividing complex electrical signals into predetermined groups of frequency components.

In signaling systems there are a number of applications where a filter system is required to provide two separate channels with two different frequency portions of an original signal. In some of these applications the signals are subject to separate operations after their separation and then are recombined. Such may be the case, for example, in television transmission apparatus employing the well-known "mixed highs" principle.

In accordance with the present invention a channel dividing filter network is provided having a sharp division between the two adjacent frequency bands that it supplies to separate utilization channels. By applying appropriate bucking signals to the respective "low" and "high" frequency signal paths through cross coupled feedback paths, the invention provides a simple frequency band separation system with little overlap of the separated frequency bands. Due to the relatively few components which the present invention requires, the sharp division of adjacent frequency bands is achieved substantially without introduction of phase shift errors which are often appreciable when multi-section filters are employed.

Accordingly it is a primary object of the present invention to provide an improved frequency band separation system.

A further object of the present invention is to provide a simple channel dividing filter network with sharp division of two adjacent frequency bands.

An additional object of the present invention is to provide a signaling system with apparatus for separating the high frequency components of a signal from the low frequency components of the signal with little overlap.

Another object of the present invention is to provide a frequency band separation system wherein the response of each of the respective frequency band signal paths to frequencies in the pass band of the other is substantially lessened.

Other and incidental objects and advantages of the present invention will become apparent to those skilled in the art after a reading of the following specification and an inspection of the accompanying drawings in which.

Figure 1:
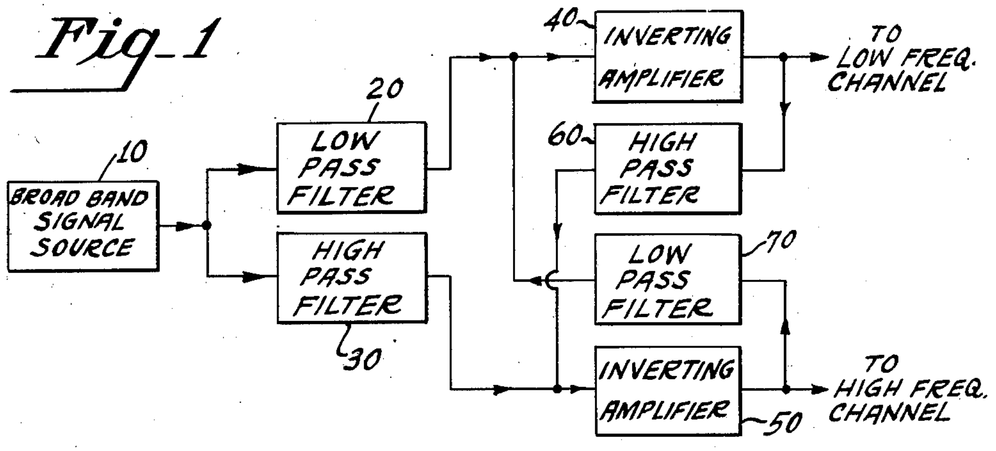
Figure 1 illustrates in block form a filter network in accordance with the present invention.

Referring to Figure 1 in greater detail, a source of signals, the frequency components of which may extend over a relatively broad band, is shown in the block labeled 10. It will be appreciated that the terms "broad," "low" and "high" used in the following description are intended as relative terms only. The present invention is generally applicable to all frequency ranges. Thus, no specific frequency values or limitations should be read into the words "broad," "low" or "high."

Figure 3:
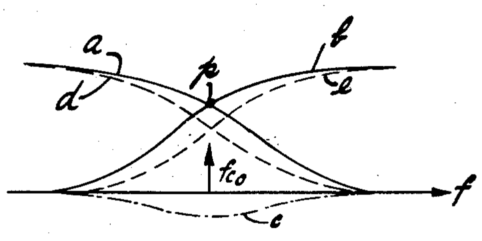
Figure 3 illustrates graphically frequency response characteristics of various filter network components in accordance with an embodiment of the invention.

The output of the signal source 10 is applied cophasally to the low pass filter 20 and the high pass filter 30. The low pass filter 20 may have a frequency response characteristic as shown in Figure 3 by curve *a* (the lower frequency portion of which is not illustrated). The high pass filter 30 may have a frequency response characteristic such as shown in Figure 3 by curve *b* (the upper frequency portion of which is not illustrated). The point of crossover (labeled *p*) of the respective characteristics *a* and *b* occurs at a crossover frequency labeled $f_{co}$. Where the filters 20 and 30 are essentially complementary (inverse reactance) filters, the amplitude of response for each at the crossover *p* is in the neighbohood of 70% of the maximum response. It may be seen by an inspection of the curves *a* and *b* in Figure 3 that there is a considerable region of overlap surrounding the crossover frequency $f_{co}$ wherein the response of each filter to frequencies in the pass band of the other is high. The present invention is directed toward the lessening of the response in the respective low frequency and high frequency signal paths in this region of overlap.

Thus, the low frequency signal path, which includes filter 20, is provided with an inverting amplifier or phase inverter 40, and the high frequency signal path which includes filter 30 is provided with a like inverting amplifier or phase inverter 50. Cross-couplings between the two signal paths are then established to provide appropriate bucking signals in the overlap region to the respective signal paths. One of these cross-couplings comprises the high pass filter 60 which is coupled between the output of the inverting amplifier 40 and the input of the inverting amplifier 50. The other of these cross-couplings comprises a low pass filter 70 which is coupled between the output of the inverting amplifier 50 and the input of the inverting amplifier 40.

The feedback signals thus applied to the low frequency signal path are subject to the frequency characteristic of the high pass filter 30, the phase inversion introduced by amplifier 50 and the frequency characteristic of the low pass filter 70. Assuming that filter 70 has a frequency response characteristic *a* similar to that of filter 20, the net frequency characteristic of the components 30, 50 and 70 to which these feedback signals are subject takes the band pass form illustrated by curve *c* in Figure 3. It is thus seen that the feedback path through filter 70 contributes a bucking signal in the overlap region, which provides the low frequency signal path with an effective frequency response characteristic of the shape illustrated by *d* in Figure 3.

Similarly the feedback of signals through high pass filter 60 (assuming filter 60 has a frequency response characteristic *b* similar to that of filter 30) also provides a bucking signal in the overlap region which obeys the frequency characteristic illustrated as *c*. The high frequency signal path is thus given an effective frequency response characteristic of the shape illustrated by curve *e* in Figure 3. An examination of the curves *d* and *e* in Figure 3 shows that the response of the respective signal paths at the crossover frequency is reduced by the present invention to an amplitude in the neighborhood of 50% of the maximum response of each path. Also the response of the low frequency signal path to frequencies above the crossover frequency, and the response of the high frequency signal path to frequencies below the crossover frequency have been substantially lessened.

Figure 2:
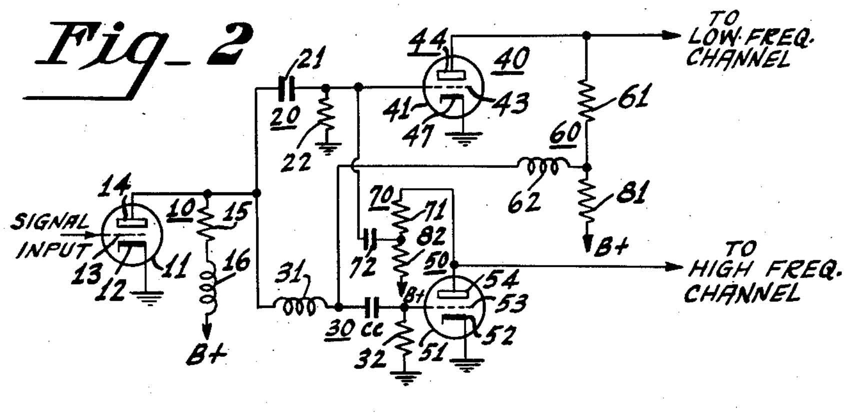
Figure 2 illustrates schematically a particular exemplification of the network shown in Figure 1.

Figure 2 illustrates in detail a form which the filter system generally described in Figure 1 may take. Thus the signal source 10 is illustrated as an amplifier 11 having a grounded cathode 12, a control grid 13 to which the broad band input signal is applied, a plate 14 and an anode circuit including resistor 15, inductance 16, and a suitable source of plate supply voltage (not illustrated). The low pass filter 20 comprises a simple RC network including the capacitor 21 and the resistor 22. The inverting amplifier 40 is illustrated as a triode 41 having a grounded cathode 42, a control grid 43 and an anode 44. The capacitor 21 of the filter 20 is coupled between the plate 14 of the signal source 10 and the control grid 43 of the amplifier 40. The resistor 22 is connected between grid 43 and ground.

The high pass filter 30 comprises a simple LR network including the inductor 31 and the resistor 32. The inverting amplifier 50 is illustrated as a triode 51 having a grounded cathode 52, a control grid 53 and a plate 54. The inductor 31 of the filter 30 is included in the connection between the plate 14 of the signal source 10 and the grid 53 of the inverting amplifier 50, while the resistor 32 is connected between grid 53 and ground. The feedback path between the output of the amplifier 40 and the input of the amplifier 50 includes as the high pass filter 60 another simple LR network comprising the anode resistor 61, and the inductor 62. A coupling capacitor CC is provided in the connection of the filter 60 to the control grid 53. The capacitance of the capacitor CC, which serves to block the plate supply voltage from grid 53, may be quite high, and thus the capacitor CC may be considered as substantially a short circuit at the high frequencies which appear in the high frequency signal path. The feedback path from the output of amplifier 50 to the input of amplifier 40 is illustrated as comprising a simple RC network including a capacitor 72 and a plate resistor 71. Suitable connections of the plate 54 and the anode 44 to the source of plate voltage are made through the respective resistors 81 and 82. As indicated by the arrows, the separated low frequency components of the applied signal may be derived from the plate 44 for utilization in a low frequency channel, while the high frequency components of the applied signal may be derived from the plate 54 for utilization in a high frequency channel.

In the discussion of the characteristics illustrated in Figure 3, it was assumed that the high pass filter 60 had a characteristic similar to that of the high pass filter 30, and that the low pass filter 70 had a characteristic similar to that of the filter 20. Thus the crossover between the characteristics of the filters 20 and 60 and the crossover between the characteristics of the filters 30 and 70 both occur at the same crossover frequency $f_{co}$ as the crossover between the characteristics of the filters 20 and 30. The peak of the "bucking" characteristic *c* therefore occurs at the crossover frequency $f_{co}$.

Figure 4:
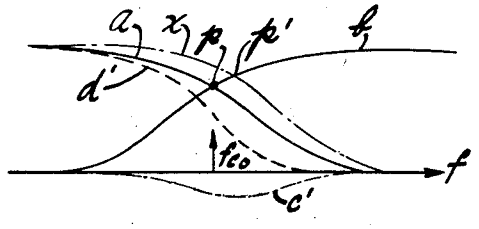
Figure 4 illustrates graphically frequency characteristics of filter network components in accordance with another embodiment of the present invention.

Figure 4 illustrates the effects of a modification of such conditions. By way of example, it may now be assumed that the low pass filter 70 has a frequency response characteristic *x* which differs from that of the low pass filter 20. As shown in Figure 4 the crossover *p'* between characteristic *x* and the characteristic *b* of the high pass filter 30 occurs at a frequency higher than the crossover frequency $f_{co}$. As a result the band pass characteristic for the feedback signals applied to the inverting amplifier 40 will take the form illustrated by the curve *s'*, and the bucking signal peak for the low frequency signal path will thus occur at a frequency higher than $f_{co}$. The effective response characteristic for the low frequency signal path will then take the form of curve *d'* which drops off very sharply in response to frequencies above the crossover frequency $f_{co}$.

By similarly choosing a response characteristic for filter 60 such that its crossover with the characteristic *a* occurs at a frequency lower than $f_{co}$, the high frequency signal path may be given an effective frequency characteristic complementary to *d'* that drops off very sharply in response to frequencies below the crossover frequency $f_{co}$.

It may thus be seen that the nature and degree of frequency band separation effected by the present invention is subject to variation depending upon the chosen relationship between the frequency response characteristics of the low and high pass networks in the cross-coupled feedback paths and the characteristics of the low and high pass networks in the main signal paths.

Having thus described the invention, what I claim is:

1. In a signaling system, apparatus for separating the high frequency components of a signal from the low frequency components of said signal, said apparatus comprising in combination a low pass network, a high pass network, means for cophasally applying said signal to said low pass network and to said high pass network, a pair of phase inverters each having respective input and output circuits, the input circuit of one of said pair of phase inverters being coupled to said low pass network, the input circuit of the other of said pair of phase inverters being coupled to said high pass network, a feedback circuit coupling the output circuit of said one phase inverter to the input circuit of said other phase inverter, a second high pass network being included in said feedback circuit, and an additional feedback circuit coupling the output circuit of said other phase inverter to the input circuit of said one phase inverter, a second low pass network being included in said additional feedback circuit.

2. A frequency separation system adapted to apply low frequency components of an input signal to a low frequency channel and high frequency components of the signal to a high frequency channel comprising in combination a pair of phase inverters each having respective input and output circuits, the output circuit of one of said phase inverters being coupled to said low frequency channel and the output circuit of the other of said phase inverters being coupled to said high frequency channel, a pair of high pass networks, a pair of low pass networks, means for applying said signal to said one phase inverter through one of said low pass networks, means for applying said signal to said other phase inverter through one of said high pass networks, means including the other of said low pass networks for coupling the output circuit of said other phase inverter to the input circuit of said one phase inverter, and means including the other of said high pass networks for coupling the output circuit of said one phase inverter to the input circuit of said other phase inverter.

3. In a signalling system including a source of signals, a frequency separation system comprising in combination a first signal path coupled to said source including a low pass filter and a first phase inverter, a second signal path coupled to said source including a high pass filter and a second phase inverter, the frequency response characteristics of said filters having a predetermined crossover frequency, a pair of cross couplings between said signal paths, each of said cross couplings adapted to apply a bucking signal to a respective one of said signal paths, each of said cross couplings including respective means for substantially limiting said bucking signal to a band of frequencies relatively narrow as compared with pass bands of said filters and including said predetermined crossover frequency, one of said cross couplings being between the output of said second phase inverter and the input of said first phase inverter, the bucking signal frequency limiting means included in said one cross coupling comprising a low pass filter, and the other of said cross couplings being between the output of said first phase inverter and the input of said second phase inverter, the bucking signal frequency limiting means included in said other cross coupling comprising a high pass filter.

4. A frequency band separation system comprising in combination a source of signals, a first signal path coupled to said source including a low pass filter and a first inverting amplifier, a second signal path coupled to said source including a high pass filter and a second inverting amplifier, the frequency response characteristics of said filters having a predetermined crossover frequency, and means coupled to said second phase inverter for applying a bucking signal to said first signal path whereby the response of said first signal path to frequencies above said crossover frequency is lessened, means coupled to said first inverting amplifier for applying a bucking signal to said second signal path whereby the response of said second signal path to frequencies below said crossover frequency is lessened, said first named bucking signal applying means including means for effectively limiting the bucking signals applied thereby to a predetermined band of frequencies including only a portion of the pass band of said low pass filter, said second named bucking signal applying means including means for effectively limiting the bucking signals applied thereby to a predetermined band of frequencies including only a portion of the pass band of said high pass filter.

5. A system in accordance with claim 4 wherein said means for applying a bucking signal to said first signal path includes a second low pass filter, and wherein said means for applying a bucking signal to said second signal path includes a second high pass filter.

6. A system in accordance with claim 4 wherein said means for applying a bucking signal to said first signal path includes a second low pass filter, and said means for applying a bucking signal to said second signal path includes a second high pass filter, the frequency response characteristics of said first high pass filter and said second low pass filter having a crossover frequency substantially equal to said predetermined crossover frequency, and the frequency response characteristics of said first low pass filter and said second high pass filter having a crossover frequency substantially equal to said predetermined crossover frequency.

7. A frequency band separation system comprising in combination a source of signals, a first signal path coupled to said source including a low pass filter and an inverting amplifier, a second signal path coupled to said source including a high pass filter and a second inverting amplifier, the frequency response characteristics of said filters having a predetermined crossover frequency, means including a second low pass filter coupled to said second phase inverter for applying a bucking signal to said first signal path whereby the response of said first signal path to frequencies above said crossover frequency is lessened, means including a second high pass filter coupled to said first phase inverter for applying a bucking signal to said second signal path whereby the response of said second signal path to frequencies below said crossover frequency is lessened, the frequency response characteristics of said low pass filter and second high pass filter having a crossover frequency lower than said predetermined crossover frequency.

8. A system in accordance with claim 7 wherein the frequency response characteristics of said high pass filter and said second low pass filter have a crossover frequency higher than said predetermined crossover frequency.

References Cited in the file of this patent

UNITED STATES PATENTS

| | | |
|---|---|---|
| 1,565,522 | Stone | Dec. 15, 1925 |
| 2,255,642 | Artzt | Sept. 9, 1941 |
| 2,438,217 | Johnson | Mar. 28, 1948 |
| 2,474,191 | Reid et al. | June 21, 1949 |